United States Patent
Yamaguchi et al.

(10) Patent No.: US 10,751,705 B2
(45) Date of Patent: Aug. 25, 2020

(54) CHABAZITE ZEOLITE WITH HIGH HYDROTHERMAL RESISTANCE AND METHOD FOR PRODUCING SAME

(71) Applicant: JGC CATALYSTS AND CHEMICALS LTD., Kawasaki-shi, Kanagawa (JP)

(72) Inventors: Yoko Yamaguchi, Kitakyushu (JP); Shunji Tsuruta, Kitakyushu (JP); Akira Nakashima, Kitakyushu (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 0 days.

(21) Appl. No.: 16/305,025

(22) PCT Filed: Jun. 1, 2017

(86) PCT No.: PCT/JP2017/020478
§ 371 (c)(1),
(2) Date: Nov. 27, 2018

(87) PCT Pub. No.: WO2017/213022
PCT Pub. Date: Dec. 14, 2017

(65) Prior Publication Data
US 2019/0330070 A1    Oct. 31, 2019

(30) Foreign Application Priority Data

Jun. 7, 2016 (JP) ................................. 2016-113524
Oct. 20, 2016 (JP) ................................. 2016-205715

(51) Int. Cl.
| | | |
|---|---|---|
| *B01J 29/70* | (2006.01) | |
| *C01B 39/02* | (2006.01) | |
| *B01J 29/76* | (2006.01) | |
| *B01J 35/10* | (2006.01) | |
| *B01J 37/10* | (2006.01) | |

(52) U.S. Cl.
CPC ........ *B01J 29/763* (2013.01); *B01J 29/7015* (2013.01); *B01J 35/1019* (2013.01); *B01J 35/1038* (2013.01); *B01J 37/10* (2013.01); *C01B 39/026* (2013.01); *B01J 2229/16* (2013.01); *B01J 2229/36* (2013.01); *C01P 2002/04* (2013.01); *C01P 2002/77* (2013.01); *C01P 2006/12* (2013.01); *C01P 2006/13* (2013.01); *C01P 2006/14* (2013.01)

(58) Field of Classification Search
CPC ....... C01B 39/026; B01J 29/723; B01J 37/10; B01J 29/763; B01J 29/7015; B01J 2229/16; B01J 2229/36; C01P 2002/04; C01P 2002/77; C01P 2006/12; C01P 2006/13; C01P 2006/14
See application file for complete search history.

(56) References Cited

U.S. PATENT DOCUMENTS

| | | |
|---|---|---|
| 2006/0115399 A1 | 6/2006 | Yuen |
| 2007/0286798 A1 | 12/2007 | Cao et al. |
| 2012/0269719 A1 | 10/2012 | Moden et al. |
| 2013/0280160 A1 | 10/2013 | Ariga et al. |
| 2016/0023912 A1 | 1/2016 | Goel et al. |
| 2019/0330070 A1* | 10/2019 | Yamaguchi ............ B01J 37/009 |

FOREIGN PATENT DOCUMENTS

| | | |
|---|---|---|
| JP | 2008-521744 A | 6/2008 |
| JP | 2010-163349 A | 7/2010 |
| JP | 2010-215434 A | 9/2010 |
| JP | 2012-211066 A | 11/2012 |
| JP | 2014-515723 A | 7/2014 |
| JP | 2015-101506 A | 6/2015 |

OTHER PUBLICATIONS

Aug. 8, 2017 International Search Report issued in International Patent Application No. PCT/JP2017/020478.
Oct. 29, 2019 Office Action issued in Indian Patent Application No. 201817045914.
Nov. 5, 2019 Extended Search Report issued in European Patent Application No. 17810200.0.

* cited by examiner

*Primary Examiner* — David M Brunsman
(74) *Attorney, Agent, or Firm* — Oliff PLC

(57) ABSTRACT

Chabazite zeolites have a problem of low hydrothermal resistance. By steam treating a chabazite zeolite having a silica-alumina ratio and a crystallinity that are within certain ranges, a chabazite zeolite having a high crystallinity and a high hydrothermal resistance can be obtained.

18 Claims, No Drawings

CHABAZITE ZEOLITE WITH HIGH HYDROTHERMAL RESISTANCE AND METHOD FOR PRODUCING SAME

TECHNICAL FIELD

The present invention relates to chabazite zeolite (hereinafter referred to also as CHA zeolite) and a method of producing the same.

BACKGROUND ART

CHA zeolite is zeolite having a CHA framework defined by the International Zeolite Association (IZA). In general, CHA zeolite is synthesized by a method using an organic structure directing agent (hereinafter referred to also as SDA) as in PATENT DOCUMENT 1. It is also possible to synthesize CHA zeolite by a method using no SDA as in PATENT DOCUMENT 2.

CHA zeolite can be used, for instance, for separating gases, reducing nitrogen oxides contained in automobile exhaust gas, and converting lower alcohols and other oxygen-containing hydrocarbons into liquid fuel, and as a catalyst for producing dimethylamine. These applications utilize pores derived from a zeolite framework of CHA zeolite and CHA zeolite having high crystallinity is therefore required.

CHA zeolite also has a problem in that its zeolite framework is broken when the CHA zeolite is exposed to high temperatures in the presence of moisture (hydrothermal resistance). For instance, when CHA zeolite having low hydrothermal resistance is used to reduce nitrogen oxides contained in automobile exhaust gas or to remove hazardous components in gas emissions from factories, its zeolite framework is broken during use and its inherent performance cannot be therefore exhibited.

CITATION LIST

Patent Documents

PATENT DOCUMENT 1: JP 2010-163349 A
PATENT DOCUMENT 2: JP 2015-101506 A

SUMMARY OF THE INVENTION

Problem to be Solved by the Invention

An object of the present invention is to provide CHA zeolite having high crystallinity and high hydrothermal resistance.

Means for Solving the Problem

CHA zeolite having high crystallinity and high hydrothermal resistance is obtained by heating (steam-treating) CHA zeolite having a silica-alumina molar ratio and a crystallinity falling within the ranges defined below in a water vapor atmosphere under conditions including features (4) and (5) to be described later (this method is referred to also as production method of the invention).

5≤silica-alumina molar ratio; and
100%≤crystallinity

Effect of the Invention

The present invention can provide CHA zeolite having high crystallinity and high hydrothermal resistance.

DESCRIPTION OF EMBODIMENTS

<Production Method of the Invention>

The production method of the invention is a method which includes steam-treating CHA zeolite having a silica-alumina molar ratio and a crystallinity falling within the ranges defined above (the CHA zeolite before being subjected to steam treatment is referred to also as precursor) to obtain CHA zeolite having high crystallinity and high hydrothermal resistance (the CHA zeolite obtained by the production method of the invention is referred to also as zeolite of the invention). A part of Al is removed from the zeolite framework of CHA zeolite as a result of steam treatment of the CHA zeolite. CHA zeolite after removal of a part of Al from the zeolite framework of the CHA zeolite has higher hydrothermal resistance. However, when a part of Al is removed from the zeolite framework of the CHA zeolite, its zeolite framework is damaged to reduce the crystallinity of the CHA zeolite obtained. Then, CHA zeolite having a silica-alumina molar ratio and a crystallinity falling within predetermined ranges is used as a precursor to perform stream treatment under specific conditions, whereby CHA zeolite having high crystallinity and high hydrothermal resistance can be obtained. The production method of the invention is described below in detail.

The above-mentioned precursor has a CHA framework. If the above-mentioned precursor does not have a CHA framework, the zeolite of the invention cannot be obtained even after steam treatment.

Whether or not the precursor has a CHA framework can be determined from an X-ray diffraction pattern of the above-mentioned precursor. Specifically, when the X-ray diffraction pattern of the above-mentioned precursor has a diffraction peak derived from a CHA framework, the precursor can be determined to have the CHA framework. Detailed measurement conditions and the like will be described later.

The silica-alumina molar ratio of the above-mentioned precursor is in the range defined below.

5≤silica-alumina molar ratio

The silica-alumina molar ratio of the above-mentioned precursor is preferably in the range defined below. A silica-alumina molar ratio of less than 7 is not preferred because the crystallinity of the zeolite of the invention obtained by steam treatment is reduced. When the silica-alumina molar ratio is more than 15, the hydrothermal resistance is not improved so much even after steam treatment.

7≤silica-alumina molar ratio≤15

Further, the silica-alumina molar ratio of the above-mentioned precursor is particularly preferably in the range defined below. When the above-mentioned precursor whose silica-alumina molar ratio is in this range is subjected to steam treatment, the hydrothermal resistance is further improved.

7≤silica-alumina molar ratio<10

The silica-alumina molar ratio of the above-mentioned precursor can be calculated from the Si and Al contents in the above-mentioned precursor. Specifically, the silica-alumina molar ratio can be calculated by converting the concentrations of Si and Al in the precursor by mass % into molarities of $SiO_2$ and $Al_2O_3$, and dividing the molarity of $SiO_2$ by the molarity of $Al_2O_3$. Detailed measurement conditions and the like will be described later.

The crystallinity of the above-mentioned precursor is in the range defined below.

100%≤crystallinity

The crystallinity of the above-mentioned precursor is preferably in the range defined below.

200%≤crystallinity

A precursor having a crystallinity of less than 100% is not preferred because the crystallinity of the zeolite of the invention obtained by steam-treating the precursor is reduced. The zeolite of the invention having low crystallinity is not preferred because pores derived from the CHA framework do not sufficiently grow and the performance in each of a catalytic reaction and an adsorption reaction is reduced when the zeolite of the invention having low crystallinity is used in the catalytic reaction and the adsorption reaction making use of the pores. Specifically, when the zeolite of the invention having low crystallinity is used in the catalytic reaction making use of the pores, the catalytic activity and the selectivity are reduced. Then, when the zeolite of the invention having low crystallinity is used in the adsorption reaction making use of the pores, a specific chemical substance may not be selectively adsorbed or the amount of adsorption may be reduced. On the other hand, steam treatment of the above-mentioned precursor having high crystallinity is preferred because the resulting zeolite of the invention also has high crystallinity.

The crystallinity of the above-mentioned precursor is calculated from the X-ray diffraction patterns of the precursor of the invention and a reference sample. Specifically, CHA zeolite synthesized based on the Chabazite synthesis method described on the website of the International Zeolite Association (http://www.iza-online.org/synthesis/) or VERIFIED SYNTHESES OF ZEOLITIC MATERIALS, H. Robson, Editor, K. P. Lillerud, XRD Patterns, 2001, Second Edition, pp 123-125 is used as a reference sample to calculate the crystallinity of the precursor from the ratio between heights at specific peaks of X-ray diffraction patterns of the reference sample and the above-mentioned precursor. Detailed measurement conditions will be described later.

The primary particle size of the above-mentioned precursor is preferably in the range defined below.

0.05 μm≤primary particle size≤10 μm

The case in which the above-mentioned precursor has a primary particle size smaller than 0.05 μm is not preferred because the crystallinity of the above-mentioned precursor may be reduced below 100%. The primary particle size smaller than 0.05 μm is also not preferred because crystals of the above-mentioned precursor are easily broken by steam treatment and the crystallinity of the resulting zeolite of the invention may be reduced. The case in which the above-mentioned precursor has a primary particle size larger than 10 μm is preferred because the crystallinity is easily increased. It is difficult, however, to synthesize the above-mentioned precursor having a primary particle size larger than 10 μm.

The primary particle size of the above-mentioned precursor is more preferably in the range defined below.

0.1 μm≤primary particle size≤5 μm

The above-mentioned precursor having a primary particle size falling within the range defined above is preferred because the crystals are not easily broken even after steam treatment and the crystallinity of the resulting zeolite of the invention is increased.

The above-mentioned primary particle size is calculated by observing primary particles with a scanning electron microscope (SEM). Specifically, 10 primary particles are sampled at random from an SEM image and an average value of the major axis lengths of the primary particles is taken as a primary particle size. Detailed measurement conditions and the like will be described later.

Alkali metals such as sodium and potassium are preferably contained in the above-mentioned precursor in amounts in the range defined below.

0 ppm≤alkali metals≤5,000 ppm

The alkali metals contained in the above-mentioned precursor are derived from materials of the above-mentioned precursor and most of them are present in the state of ion exchange at a cation site of the CHA zeolite. Steam treatment which is performed in a state in which alkali metals are contained in large amounts in the framework of the CHA zeolite contained in the above-mentioned precursor is less effective although the reason therefor is not exactly known.

These alkali metals can be removed through ion exchange of the above-mentioned precursor with H and $NH_3$. Specifically, the alkali metals can be removed by immersing the above-mentioned precursor in an aqueous solution containing HCl or $NH_4NO_3$ dissolved therein. According to the production method of the invention, the above-mentioned precursor is preferably subjected to ion exchange in an aqueous solution containing $NH_4NO_3$ dissolved therein. The alkali metals can be removed without reducing the crystallinity of the above-mentioned precursor by subjecting the above-mentioned precursor to ion exchange in an aqueous solution containing $NH_4NO_3$ dissolved therein.

Preferably, the above-mentioned precursor substantially contains no P in its zeolite framework. Accordingly, the above-mentioned precursor preferably contains no SAPO-34 which is a kind of CHA zeolite containing P in its zeolite framework.

Further, P which is contained in a synthetic material or the like may remain in the above-mentioned precursor. In such a case, when the content is approximately 1,000 ppm or less, P may be deemed not to be substantially contained.

The above-mentioned steam treatment is a process of heating the above-mentioned precursor in an atmosphere in which the moisture content is equal to or more than 50% of the amount of saturated water vapor.

50%≤moisture content

The above-mentioned moisture content is preferably in the range defined below.

50%≤moisture content≤100%

When steam treatment is performed in a state in which the moisture content is in the range defined above, a part of Al can be removed from the zeolite framework without excessively breaking the zeolite framework of the CHA zeolite contained in the above-mentioned precursor. The case in which the moisture content is less than 50% of the amount of saturated water vapor is not preferred because Al is not easily removed from the zeolite framework of the CHA zeolite contained in the above-mentioned precursor and the hydrothermal resistance of the resulting zeolite of the invention is not easily improved. On the other hand, the case in which the moisture content exceeds the amount of saturated water vapor (in other words, the case in which the moisture content exceeds 100%) is not preferred because although the situation varies depending on the heating temperature, Al is rapidly removed from the zeolite framework of the CHA zeolite contained in the above-mentioned precursor to cause damage to the zeolite framework, whereby the crystallinity of the resulting zeolite of the invention may be reduced.

The treatment temperature in the above-mentioned steam treatment is in the range defined below.

450° C.≤treatment temperature≤800° C.

The above-mentioned treatment temperature is preferably in the range defined below.

500° C.≤treatment temperature≤675° C.

When steam treatment is performed in a state in which the above-mentioned treatment temperature is in the range defined above, a part of Al can be removed from the zeolite framework without excessively breaking the zeolite framework of the CHA zeolite contained in the above-mentioned precursor. The case in which the above-mentioned treatment temperature is lower than 450° C. is not preferred because Al is not easily removed from the zeolite framework of the CHA zeolite contained in the above-mentioned precursor and the hydrothermal resistance of the resulting zeolite of the invention is not easily improved. On the other hand, the case in which the above-mentioned treatment temperature is higher than 800° C. is not preferred because although the situation varies depending on the above-mentioned moisture content, Al is rapidly removed from the zeolite framework of the CHA zeolite contained in the above-mentioned precursor to cause damage to the zeolite framework, whereby the crystallinity of the resulting zeolite of the invention may be reduced. The crystallinity of the CHA zeolite can be maintained by slowly removing Al while controlling the above-mentioned moisture content and the treatment time to be mentioned below in appropriate ranges, respectively.

The treatment time in the above-mentioned steam treatment is preferably in the range defined below.

0.1 hours≤treatment time≤48 hours

The case in which the above-mentioned treatment time is shorter than 0.1 hours is not preferred because Al is not sufficiently removed from the zeolite framework of the CHA zeolite contained in the above-mentioned precursor and the hydrothermal resistance of the resulting zeolite of the invention is not easily improved. On the other hand, even when the above-mentioned heating time is longer than 48 hours, the amount of Al removed from the zeolite framework of the CHA zeolite contained in the above-mentioned precursor does not change so much.

The treatment time in the steam treatment according to the invention refers to the retention time after the heating temperature is reached.

The above-mentioned steam treatment may be performed in an air atmosphere or an inert atmosphere such as nitrogen. In order to keep such atmospheres, the steam treatment may be performed in a hermetically sealed container or in a stream of air or inert gases. Further, a method with which moisture can be added can be used as a method of adding moisture to the above-mentioned atmosphere, examples thereof including a method which includes vaporizing water and mixing the vaporized water with gases, a method which includes charging water in a reactor in advance, and a method which includes charging in a state of moisture contained in the precursor.

The above-mentioned stream treatment can be performed by conventionally known methods using a muffle furnace, a tube furnace and a kiln, and any of them can be used to perform steam treatment in the same manner.

The above-mentioned precursor can be obtained by a conventionally known production method. For instance, the precursor can be obtained by a method which includes subjecting an aqueous solution containing an Si material, an Al material, and an organic structure directing agent (SDA) to hydrothermal treatment, as in PATENT DOCUMENT 1 mentioned above. The precursor can also be obtained by a method which includes subjecting an aqueous solution containing FAU zeolite and a potassium compound to hydrothermal treatment as in PATENT DOCUMENT 2 mentioned above. The latter method is excellent in economic efficiency in that SDA is not used.

In the zeolite of the invention, Al removed from the zeolite framework by steam treatment remains outside the zeolite framework. It is not known in what state Al is present but Al is deemed to be present in the state of compounds such as $Al_2O_3$ and $Al(OH)_3$. Al which remains outside the zeolite framework as described above can be removed, if necessary, by a method such as acid treatment, for example. Specifically, Al which remains outside the zeolite framework can be removed by immersing the zeolite of the invention in an acid solution.

[Zeolite of the Invention]

The zeolite of the invention is obtained by the above-mentioned production method of the invention. The zeolite of the invention is described below in detail.

The zeolite of the invention includes CHA zeolite. Further, the zeolite of the invention has high hydrothermal resistance because a part of Al is removed from the zeolite framework of the CHA zeolite by steam treatment. Further, the zeolite of the invention is obtained by steam-treating the precursor having a silica-alumina molar ratio and a crystallinity falling within the above-mentioned ranges and has therefore high crystallinity.

The CHA zeolite contained in the zeolite of the invention has a smaller lattice constant as compared to that before steam treatment because a part of Al having a larger ionic radius than Si is removed from its zeolite framework. Specifically, the lattice constant of the zeolite of the invention is in the range defined below.

13.74 Å≤lattice constant

The lattice constant of the zeolite of the invention is preferably in the range defined below.

13.50 Å≤lattice constant≤13.72 Å

The zeolite of the invention having a lattice constant larger than 13.74 Å may have lower hydrothermal resistance and is therefore not preferred. When the CHA zeolite having low hydrothermal resistance is used as a catalyst for use in a high-temperature high-humidity environment (for instance, for $NO_x$ removal reaction using $NH_3$: also called $NH_3$—SCR reaction), the CHA framework is broken and the catalytic activity is therefore easily reduced.

On the other hand, the zeolite of the invention having a lattice constant smaller than 13.50 Å is not preferred because the crystallinity is easily reduced although the hydrothermal resistance is increased. The zeolite of the invention having a lattice constant smaller than 13.50 Å is also not preferred because when it is used as an adsorbent, crystals are in a rather shrinking state and a compound to be adsorbed is therefore not easily diffused in the zeolite framework. Further, the zeolite of the invention may be exchanged, if necessary, with cations such as Cu and Fe at its cation site. However, when the lattice constant is smaller than 13.50 Å, these cations are not diffused easily in the zeolite framework, and the lattice constant smaller than 13.50 Å is therefore not preferred.

The lattice constant of the zeolite of the invention can be calculated from the X-ray diffraction pattern. Specifically, diffraction peaks attributable to (2-10) (3-1-1) planes of the CHA framework are found from the X-ray diffraction pattern of the zeolite of the invention and the lattice constant is calculated from 26 values of the peaks. Detailed measurement conditions and the like will be described later.

The zeolite of the invention contains Si and Al. The Si content and the Al content in the zeolite of the invention are preferably in the ranges defined below in terms of their oxides (Si is calculated as $SiO_2$ and Al is calculated as $Al_2O_3$).

80.5 mass % ≤ Si content ≤ 90 mass %

10 mass % ≤ Al content ≤ 19.5 mass %

The Si content and the Al content in the zeolite of the invention can be measured by ICP optical emission spectrometry. Details of the measurement method will be described later.

Preferably, the zeolite of the invention substantially contains no P in its zeolite framework. Accordingly, the zeolite of the invention preferably contains no SAPO-34 which is a kind of CHA zeolite containing P in its zeolite framework. However, P may be supported as required outside the zeolite framework. P which is contained in a synthetic material or the like may remain in the zeolite of the invention. In such a case, when the content is approximately 1,000 ppm or less, P may be deemed not to be substantially contained.

The silica-alumina molar ratio in the zeolite of the invention is preferably in the range defined below.

7 ≤ silica-alumina molar ratio ≤ 15

The zeolite of the invention in which the silica-alumina molar ratio is in the range defined above is excellent in catalytic activity and durability when used in a $NH_3$—SCR reaction. The method of determining the silica-alumina molar ratio in the zeolite of the invention will be described later.

The crystallinity of the zeolite of the invention is in the range defined below.

140% ≤ crystallinity

The zeolite of the invention whose crystallinity is too low is not preferred because the CHA framework does not sufficiently grow and the catalytic activity is therefore reduced when used as a catalyst. The crystallinity of the zeolite of the invention is more preferably in the range defined below.

200% ≤ crystallinity ≤ 300%

In a case in which the crystallinity of the zeolite of the invention is in the range defined above, the zeolite of the invention is particularly excellent in catalytic activity when used as a catalyst.

The pore volume (PV) of the zeolite of the invention is preferably in the range defined below.

0.2 mL/g ≤ pore volume ≤ 0.4 mL/g

The zeolite of the invention whose pore volume is in the range defined above is preferred because the amount of adsorption is increased when the zeolite of the invention is used as an adsorbent. The zeolite of the invention whose pore volume is in the range defined above is excellent in catalytic activity and selectivity also when used as a catalyst.

The pore volume is calculated from an adsorption isotherm obtained by nitrogen adsorption measurement. Detailed measurement conditions will be described later.

The specific surface area of the zeolite of the invention is preferably in the range defined below.

350 $m^2$/g ≤ specific surface area ≤ 600 $m^2$/g

The specific surface area which is too low is not preferred because the catalytic activity is reduced. It is difficult to synthesize the zeolite of the invention having a specific surface area exceeding 600 $m^2$/g.

The specific surface area is calculated from an adsorption isotherm obtained by nitrogen adsorption measurement. Detailed measurement conditions will be described later.

The zeolite of the invention is made porous by steam treatment, as described above, and its external surface area therefore tends to be increased. The external surface area of the zeolite of the invention is preferably in the range defined below.

7 $m^2$/g ≤ external surface area ≤ 20 $m^2$/g

The zeolite of the invention having a large external surface area is excellent in catalytic activity when used as a catalyst.

The external surface area is calculated from an adsorption isotherm obtained by nitrogen adsorption measurement. Detailed measurement conditions will be described later.

The primary particle size of the zeolite of the invention is preferably in the range defined below.

0.05 μm ≤ primary particle size ≤ 10 μm

The zeolite of the invention having a primary particle size smaller than 0.05 μm is not preferred because the crystallinity of the zeolite of the invention may be reduced below 100%. The hydrothermal resistance of the CHA zeolite having a small primary particle size tends to be reduced and the CHA zeolite whose primary particle size is as large as possible is therefore preferred. It is difficult, however, to synthesize the zeolite of the invention having a primary particle size larger than 10 μm.

The primary particle size of the zeolite of the invention is more preferably in the range defined below.

0.1 μm ≤ primary particle size ≤ 5 μm

The zeolite of the invention whose primary particle size is in the range defined above is preferred because the crystallinity and the hydrothermal resistance are increased.

The above-mentioned primary particle size is calculated by observing primary particles with a scanning electron microscope (SEM). Specifically, 10 primary particles are sampled at random from an SEM image and an average value of the major axis lengths of the primary particles is taken as a primary particle size. Detailed measurement conditions and the like will be described later.

When used as an adsorbent or a catalyst, the zeolite of the invention may contain elements (additional elements) such as Sr, Cr, Mn, Fe, Co, Ce, Ni, Cu, Zn, Ga, Mo, Ru, Rh, Pd, Ag, In, Sn, Re, Ir, and Pt in amounts defined below.

2 mass % ≤ additional elements ≤ 10 mass %

The zeolite of the invention may have the additional elements supported on its surfaces or be ion-exchanged with the additional elements at its ion exchange site. The additional elements are appropriately selected from the above-mentioned additional elements depending on the application of the zeolite of the invention. For instance, when used as a catalyst for reducing nitrogen oxides contained in automobile exhaust gas, the zeolite of the invention preferably contains Cu and Fe. The zeolite of the invention is more preferably ion-exchanged with Cu and Fe at its ion exchange site. The zeolite of the invention ion-exchanged with Cu and Fe at its ion exchange site is excellent in reduction activity of nitrogen oxides. A conventionally known ion-exchange method can be used as a method of supporting the above-mentioned additional elements on the zeolite of the invention. A method which includes immersing the zeolite of the invention in a solution containing any of the above-mentioned additional elements and then evaporating to dryness may also be used. A method which includes immersing the zeolite of the invention in a solution containing any of the above-mentioned additional elements and then spray drying may further be used.

EXAMPLES

The invention is described below in further detail by way of examples. However, the invention should not be construed as being limited to these examples.

[Step of Preparing Precursor (1)]

An aqueous sodium hydroxide solution (1.35 kg) having an NaOH concentration of 21.65 mass % was dissolved by adding with stirring an aqueous sodium aluminate solution (0.168 kg) having an $Al_2O_3$ concentration of 22 mass % and an $Na_2O$ concentration of 17 mass %, and the resulting solution was cooled to 30° C. This solution was added with stirring to an aqueous sodium silicate solution (1.361 kg) having an $SiO_2$ concentration of 24 mass % and an $Na_2O$ concentration of 7.7 mass %. The composition of the solution in terms of oxide molar ratio is as follows:

$Na_2O/Al_2O_3$=16
$SiO_2/Al_2O_3$=15
$H_2O/Al_2O_3$=330.

Then, this solution was allowed to stand at 30° C. for 15 hours to prepare an aluminosilicate solution.

Water (5.66 kg), silica sol (18.97 kg) having an $SiO_2$ concentration of 30 mass % (Cataloid SI-30 manufactured by JGC Catalysts and Chemicals Ltd.; average particle size: 10 nm), and the aluminosilicate solution (2.88 kg) were added to an aqueous sodium silicate solution (22.78 kg) having an $SiO_2$ concentration of 24 mass % and an $Na_2O$ concentration of 7.7 mass % and mixed with stirring. To this mixture was added an aqueous sodium aluminate solution (10.03 kg) having an $Al_2O_3$ concentration of 22 mass % and an $Na_2O$ concentration of 17 mass %, and the resulting mixture was aged with stirring at room temperature for 3 hours to prepare a mixed hydrogel slurry. The composition of the mixed hydrogel slurry in terms of oxide molar ratio is as follows:

$Na_2O/Al_2O_3$=2.80
$SiO_2/Al_2O_3$=8.70
$H_2O/Al_2O_3$=108.

The mixed hydrogel slurry (60.3 kg) was subjected to hydrothermal treatment at 95° C. for 35 hours in a crystallization chamber. Then, the slurry was cooled to 70° C. and filtered to obtain Na—Y zeolite cake (29.5 kg). The resulting Na—Y zeolite cake was further washed, filtered and dried to prepare Na—Y zeolite.

After elevating the temperature of an aqueous solution (5,000 g) containing the Na—Y zeolite (500 g) and ammonium sulfate (280 g) to 80° C. and ion-exchanging for 2 hours with stirring, the aqueous solution was filtered, washed, dried, and burned at 550° C. for 5 hours. Further, ion exchange, filtering, washing, and drying operations were performed twice under the foregoing conditions to prepare 0.95 $(NH_4)_2O \cdot 0.05$ $Na_2O \cdot Al_2O_3 \cdot 5SiO_2$ zeolite (referred to also as $NH_{4(95)}Y$ zeolite) having an $NH_4$ ion exchange ratio of 95%.

The $NH_{4(95)}Y$ zeolite was charged into a reactor and water was added so that the moisture content in the reactor reached 100% of the amount of saturated water vapor. Then, the temperature was elevated to 600° C. and held for 2 hours to prepare ultrastable FAU zeolite.

Sulfuric acid (495 g) having a concentration of 25 mass % was added dropwise to the ultrastable FAU zeolite (500 g) over 0.5 hours to perform dealuminization treatment to thereby prepare FAU zeolite having a silica-alumina molar ratio of 9.0.

An FAU zeolite slurry having an FAU zeolite concentration of 20 mass % was prepared and subjected to refining treatment using a bead mill (LMZ015 manufactured by Ashizawa Finetech Ltd.). Refining conditions at that time were as follows: zirconia beads: 0.5 mm; circumferential velocity: 10 m/s; amount of introduced beads in terms of volume percent: 85%. The refined FAU zeolite slurry (95 g) was mixed with water (60 g) and then with KOH (5.5 g) having a concentration of 95.5 mass % to prepare a synthetic slurry. The synthetic slurry was subjected to hydrothermal treatment at 150° C. for 48 hours. Then, the synthetic slurry after hydrothermal treatment was taken out, filtered, washed, and dried to prepare CHA zeolite.

The resulting CHA zeolite (100 g) was added to an aqueous solution (1,000 g) containing ammonium sulfate (100 g) and the temperature of the mixture was elevated to 60° C. After ion-exchanging for 1 hour with stirring, the mixture was filtered, washed, and dried. Further, ion exchange, filtering, washing and drying operations were performed twice under the foregoing conditions to prepare CHA zeolite having an $NH_4$ ion exchange ratio of 99%. The CHA zeolite was referred to as precursor (1)

Whether or not the resulting precursor (1) had a CHA framework was determined by the method described below. The results are shown in Table 1.

[Presence or Absence of CHA Framework]

The resulting precursor (1) was subjected to X-ray diffraction measurement under the conditions described below to determine whether or not the resulting precursor (1) had a CHA framework from the criterion of judgment described below.

<Conditions of X-Ray Diffraction Measurement>

Equipment: MiniFlex (manufactured by Rigaku Corporation)
Operation axis: 2θ/θ
Radiation source: CuKα
Method of measurement: continuous
Voltage: 40 kV
Current: 15 mA
Start angle: 2θ=5°
End angle: 2θ=50°
Sampling width: 0.020°
Scan rate: 10.000°/min <Criterion of Judgment>

The precursor is determined to have a CHA framework when the X-ray diffraction pattern obtained by the measurement has all of peaks attributable to Miller indices (100), (200), (20-1), (21-1), (211), (3-1-1), (310), and (3-1-2).

The silica-alumina molar ratio of the resulting precursor (1) was determined by the method described below. The amounts of alkali metals and P contained therein were also determined. The results are shown in Table 1.

[Method of Determining Silica-Alumina Molar Ratio]

The amounts of Si, Al, alkali metals and P contained therein were measured under the conditions described below. The amounts of the contained components were calculated in mass % in terms of their respective oxides (Si, Al, alkali metals, and P were calculated as $SiO_2$, $Al_2O_3$, $M_2O$ (M=alkali metals), and $P_2O_5$, respectively). The calculated $SiO_2$ content and $Al_2O_3$ content were converted into molar ratio to calculate the silica-alumina molar ratio ($SiO_2/Al_2O_3$).

<Measurement of Amounts of Contained $SiO_2$, $Al_2O_3$, Alkali Metals and P>

Method of measurement: ICP optical emission spectrometry
Equipment: ICP730-ES (manufactured by Varian Medical Systems, Inc.)
Sample dissolution: acid dissolution The crystallinity of the resulting precursor (1) was determined by the method described below. The results are shown in Table 1.

[Method of Determining Crystallinity]

Synthesis was performed based on the Chabazite synthesis method described on the website of the International Zeolite Association (http://www.iza-online.org/synthesis/).

Specifically, HY zeolite (25.0 g) having a silica-alumina molar ratio of 5.2 was added to a mixed solution of ion exchanged water (198.2 mL) and a 45 mass % KOH solution (26.8 mL) and the mixture was stirred for 30 seconds. The slurry was crystallized at 95° C. for 96 hours. The resulting slurry was washed twice with water (500 mL) and then dried to obtain a reference material.

The precursor (1) and the reference material obtained by the foregoing methods were subjected to X-ray diffraction measurement under the conditions described below.

<Conditions of X-Ray Diffraction Measurement>
Equipment: MiniFlex (manufactured by Rigaku Corporation)
Operation axis: 2θ/θ
Radiation source: CuKα
Method of measurement: continuous
Voltage: 40 kV
Current: 15 mA
Start angle: 2θ=5°
End angle: 2θ=50°
Sampling width: 0.020°
Scan rate: 10.000°/min The total values of the heights of respective peaks attributable to Miller indices (100), (20-1), and (3-1-1) were determined from the X-ray diffraction patterns obtained by the X-ray diffraction measurement to determine the crystallinity by the formula shown below.

$$\text{Crystallinity [\%]} = H/H_R \times 100$$

H: Total of the heights of the respective peaks of the precursor (1)
$H_R$: Total of the heights of the respective peaks of the reference material The primary particle size of the resulting precursor (1) was measured under the conditions described below. The results are shown in Table 1.

[Conditions of Primary Particle Size Measurement]

The resulting precursor (1) was observed with a scanning electron microscope (SEM) under the conditions described below. As long as the primary particle size can be checked at the magnification applied, the precursor (1) may not be necessarily observed under the conditions described below. The primary particle size was measured from the resulting image.

<Conditions of Observation with Scanning Electron Microscope (SEM)>
Measurement equipment: JEOL JSM-7600 manufactured by JEOL Ltd.
Acceleration voltage: 1.0 kV
Magnification: 20,000×

<Method of Calculating Primary Particle Size>
Ten primary particles were sampled at random from an SEM image and an average value of the major axis lengths of the primary particles was taken as the primary particle size.

Example 1

The precursor (1) (100 g) was charged into a reactor and water was added so that the moisture content in the reactor reached 100% of the amount of saturated water vapor. Then, the temperature was elevated to 800° C. and held for 20 minutes to obtain CHA zeolite.

The presence or absence of the chabazite framework, the silica-alumina molar ratio, the primary particle size, and the crystallinity of the CHA zeolite obtained in Example 1 were determined under the conditions described above. The results are shown in Table 2.

The lattice constant of the CHA zeolite obtained in Example 1 was determined under the conditions described below. The result is shown in Table 2.

[Method of Determining Lattice Constant]
<X-Ray Diffraction Measurement>
Reference sample: titanium oxide (anatase)
Mixing ratio of the reference sample: CHA zeolite titanium oxide=5:1
Equipment: MiniFlex (manufactured by Rigaku Corporation)
Operation axis: 2θ/θ
Radiation source: CuKα
Method of measurement: continuous
Voltage: 40 kV
Current: 15 mA
Start angle: 2θ=5°
End angle: 2θ=50°
Sampling width: 0.020°
Scan rate: 10.000°/min <Calculation of Lattice Constant>
The measurement data was read in the integrated X-ray powder diffraction software (PDXL) manufactured by Rigaku Corporation to perform data processing under default conditions. Next, a space group attributable to the chabazite framework was specified and Miller indices (2-10), (3-1-1) were used to calculate the lattice constant (size of axis a). Titanium oxide was used as the reference sample to correct the angle, thereby calculating the above-mentioned lattice constant.

The pore volume and the external surface area of the CHA zeolite obtained in Example 1 were measured under the conditions described below. The results are shown in Table 2.

[Method of Measuring Pore Volume and External Surface Area]
Method of measurement: nitrogen adsorption method
Measurement equipment: BEL SORP-minill (Microtrac-BEL Corp.)
Amount of sample: about 0.05 g
Pretreatment at 300° C. for 2 hours (in a vacuum)
Relative pressure range: 0 to 1.0
Calculation method:
Total pore volume: 0.990
Specific surface area and external surface area: t-plot method The hydrothermal resistance of the CHA zeolite obtained in Example 1 was evaluated under the conditions described below. Specifically, the CHA zeolite obtained in Example 1 was steam-treated and the total values of the heights of respective peaks attributable to the Miller indices (100), (20-1), and (3-1-1) of the X-ray diffraction patterns before and after the steam treatment were compared to calculate the crystallinity retention rate, thereby evaluating the hydrothermal resistance. The result is shown in Table 2.

[Method of Evaluating Hydrothermal Resistance]
The CHA zeolite obtained in Example 1 was steam-treated under the conditions described below.
<Conditions of Steam Treatment>
Equipment: tube furnace
Temperature: 700° C.
Time: 3 hours
Gas: $H_2O$ was circulated in a tube furnace at a rate of 1 mL/min.

As for the CHA zeolite after steam treatment, the total value $H_{steam}$ of the heights of respective peaks attributable to the Miller indices (100), (20-1), and (3-1-1) of the CHA zeolite obtained in Example 1 was calculated by the same method as the above-mentioned method of determining the crystallinity.

<Method of Calculating Crystallinity Retention Rate>

H obtained in the determination of the crystallinity in Example 1 and $H_{steam}$ after steam treatment were used to calculate the crystallinity retention rate from the formula shown below.

Crystallinity retention rate [%]=$H_{steam}/H\times 100$

Example 2

The precursor (1) (100 g) was charged into a reactor and water was added so that the moisture content in the reactor reached 100% of the amount of saturated water vapor. Then, the temperature was elevated to 750° C. and held for 20 minutes to obtain CHA zeolite. Further, the resulting CHA zeolite was evaluated by the same method as in Example 1. The results are shown in Table 2.

Example 3

The precursor (1) (100 g) was charged into a reactor and water was added so that the moisture content in the reactor reached 100% of the amount of saturated water vapor. Then, the temperature was elevated to 700° C. and held for 20 minutes to obtain CHA zeolite. Further, the resulting CHA zeolite was evaluated by the same method as in Example 1. The results are shown in Table 2.

Example 4

The precursor (1) (100 g) was charged into a reactor and water was added so that the moisture content in the reactor reached 100% of the amount of saturated water vapor. Then, the temperature was elevated to 650° C. and held for 20 minutes to obtain CHA zeolite. Further, the resulting CHA zeolite was evaluated by the same method as in Example 1. The results are shown in Table 2.

Example 5

The precursor (1) (100 g) was charged into a reactor and water was added so that the moisture content in the reactor reached 100% of the amount of saturated water vapor. Then, the temperature was elevated to 600° C. and held for 20 minutes to obtain CHA zeolite. Further, the resulting CHA zeolite was evaluated by the same method as in Example 1. The results are shown in Table 2.

Example 6

The precursor (1) (100 g) was charged into a reactor and water was added so that the moisture content in the reactor reached 100% of the amount of saturated water vapor. Then, the temperature was elevated to 550° C. and held for 20 minutes to obtain CHA zeolite. Further, the resulting CHA zeolite was evaluated by the same method as in Example 1. The results are shown in Table 2.

Example 7

The precursor (1) (100 g) was charged into a reactor and water was added so that the moisture content in the reactor reached 100% of the amount of saturated water vapor. Then, the temperature was elevated to 500° C. and held for 20 minutes to obtain CHA zeolite.

Comparative Example 1

The precursor (1) was evaluated as a comparative example by the same method as in Example 1. The results are shown in Table 2.

[Evaluation of $NH_3$—SCR Reaction]

$NH_3$—SCR reaction was evaluated as an example using the zeolite of the invention in a catalytic reaction. Specifically, Cu was supported on the CHA zeolite obtained in Example 6 under the conditions described below.

The CHA zeolite (10 g) obtained in Example 6 was suspended in a 1 mol/L copper nitrate trihydrate solution (100 g). The temperature of the suspension was elevated to 80° C. and the CHA zeolite was ion-exchanged for 1 hour with stirring and then filtered and washed. This operation was repeated until the amount of supported Cu reached 2 mass %, thereby obtaining Cu-CHA zeolite. A conventionally known extruder was used to extrude the Cu-CHA zeolite, thereby obtaining cylindrically extruded pellets or granular catalyst pellets.

Next, the resulting catalyst pellets as described above were evaluated for the $NH_3$—SCR reaction under the conditions described below. The results are shown in Table 3.

<Conditions for Evaluating $NH_3$—SCR Reaction>

Reaction equipment: atmospheric pressure fixed-bed flow reaction tube
Catalyst pellets: 10 cc
Reaction gases: NO: 500 ppm, $NH_3$: 500 ppm, $O_2$: 10%, $N_2$: balance
Reaction gas flow rate: 6,000 cc/min
Reaction temperature: 150° C., 200° C., 300° C.

<Method of Calculating $NO_x$ Removal Efficiency>

The $NO_x$ removal efficiency was calculated from the formula shown below in which $C_{in}$ denotes the $NO_x$ concentration at the reaction tube inlet at the time of steady state at each reaction temperature, and $C_{out}$ denotes the $NO_x$ concentration at the reaction tube outlet at the time of steady state at each reaction temperature.

$NO_x$ removal efficiency [%]=$\{(C_{in}-C_{out})/C_{in}\}\times 100$

TABLE 1

| | Precursor | | | | | | Conditions of steam treatment | | | |
|---|---|---|---|---|---|---|---|---|---|---|
| | Presence or absence of chabazite structure | Silica-alumina molar ratio [—] | Crystallinity [%] | Primary particle size [μm] | Alkali metal content [ppm] | P content [ppm] | Atmosphere | Moisture content [%] | Steam treatment temperature [° C.] | Steam treatment time [hr] |
| Example 1 | Presence | 7.9 | 236.7 | 2 | 600 | 100 | Air | 100% | 800 | 0.33 |
| Example 2 | Presence | 7.9 | 236.7 | 2 | 600 | 100 | Air | 100% | 750 | 0.33 |
| Example 3 | Presence | 7.9 | 236.7 | 2 | 600 | 100 | Air | 100% | 700 | 0.33 |

TABLE 1-continued

| | Precursor | | | | | | Conditions of steam treatment | | | |
|---|---|---|---|---|---|---|---|---|---|---|
| | Presence or absence of chabazite structure | Silica-alumina molar ratio [—] | Crystallinity [%] | Primary particle size [μm] | Alkali metal content [ppm] | P content [ppm] | Atmosphere | Moisture content [%] | Steam treatment temperature [° C.] | Steam treatment time [hr] |
| Example 4 | Presence | 7.9 | 236.7 | 2 | 600 | 100 | Air | 100% | 650 | 0.33 |
| Example 5 | Presence | 7.9 | 236.7 | 2 | 600 | 100 | Air | 100% | 600 | 0.33 |
| Example 6 | Presence | 7.9 | 236.7 | 2 | 600 | 100 | Air | 100% | 550 | 0.33 |
| Example 7 | Presence | 7.9 | 236.7 | 2 | 600 | 100 | Air | 100% | 500 | 0.33 |
| Comparative Example 1 | Presence | 7.9 | 236.7 | 2 | 600 | 100 | | | | |

TABLE 2

| | Physical properties | | | | | | | | | | Hydrothermal resistance Crystallinity retention rate |
|---|---|---|---|---|---|---|---|---|---|---|---|---|
| | Presence or absence of chabazite structure | Si content [mass %] | Al content [mass %] | Silica-alumina molar ratio [—] | Pore volume [mL/g] | Specific surface area [m²/g] | External surface area [m²/g] | Lattice constant (Å) | Crystallinity | Alkali metal content [ppm] | P content [ppm] | |
| Example 1 | Presence | 82.1 | 17.9 | 7.8 | 0.3 | 488 | 18 | 13.49 | 162.3% | 600 | 100 | 61.60% |
| Example 2 | Presence | 82.1 | 17.9 | 7.8 | 0.32 | 481 | 20 | 13.54 | 205.4% | 600 | 100 | 72.59% |
| Example 3 | Presence | 82.1 | 17.9 | 7.8 | 0.34 | 468 | 13 | 13.57 | 219.3% | 600 | 100 | 75.93% |
| Example 4 | Presence | 82.1 | 17.9 | 7.8 | 0.31 | 461 | 12 | 13.66 | 254.5% | 600 | 100 | 57.48% |
| Example 5 | Presence | 82.1 | 17.9 | 7.8 | 0.3 | 460 | 10 | 13.71 | 240.7% | 600 | 100 | 60.84% |
| Example 6 | Presence | 82.1 | 17.9 | 7.8 | 0.34 | 458 | 8 | 13.72 | 221.0% | 600 | 100 | 55.40% |
| Example 7 | Presence | 82.1 | 17.9 | 7.8 | 0.33 | 458 | 7 | 13.73 | 252.6% | 600 | 100 | 35.04% |
| Comparative Example 1 | Presence | 82.3 | 17.7 | 7.9 | 0.32 | 456 | 6 | 13.76 | 271.5% | 600 | 100 | 24.10% |

TABLE 3

| | Reaction temperature | | |
|---|---|---|---|
| | 150° C. | 200° C. | 300° C. |
| NOx removal efficiency | 32.0% | 95.7% | 100% |

The invention claimed is:

1. A method of producing chabazite zeolite comprising: steps (a) and (b):
   (a) a step of preparing a precursor having features (1), (2), and (3):
      (1) the precursor has a chabazite framework;
      (2) 7≤silica-alumina molar ratio≤15; and
      (3) 100%≤crystallinity, and
   (b) a step of steam-treating the precursor under conditions having features (4) and (5) to remove a part of Al in a zeolite framework of the precursor:
      (4) 50%≤moisture content; and
      (5) 450° C.≤treatment temperature≤800° C.

2. The method of producing chabazite zeolite according to claim 1, wherein the moisture content in an atmosphere of stream treatment in the step (b) is 50% or more but 100% or less.

3. The method of producing chabazite zeolite according to claim 1, wherein the silica-alumina molar ratio of the precursor is 7 or more but less than 10.

4. The method of producing chabazite zeolite according to claim 3, wherein the moisture content in an atmosphere of stream treatment in the step (b) is 50% or more but 100% or less.

5. The method of producing chabazite zeolite according to claim 3, wherein the crystallinity of the precursor is 200% or more.

6. The method of producing chabazite zeolite according to claim 5, wherein the moisture content in an atmosphere of stream treatment in the step (b) is 50% or more but 100% or less.

7. A chabazite zeolite comprising features (1) to (4):
   (1) the chabazite zeolite has a chabazite framework;
   (2) the chabazite zeolite contains Si and Al;
   (3) lattice constant≤13.74 Å;
   (4) 140%≤crystallinity; and
   (5) 7≤silica-alumina molar ratio<15.

8. The chabazite zeolite according to claim 7, wherein the chabazite zeolite contains Cu as an additional element and the additional element is contained in an amount of 2 mass % or more but 10 mass % or less.

9. The chabazite zeolite according to claim 7, wherein the chabazite zeolite has an external surface area of 7 m²/g or more but 20 m²/g or less.

10. The chabazite zeolite according to claim 9, wherein the chabazite zeolite contains Cu as an additional element and the additional element is contained in an amount of 2 mass % or more but 10 mass % or less.

11. The chabazite zeolite according to claim 9, wherein the chabazite zeolite has a pore volume of 0.2 mL/g or more but 0.4 mL/g or less.

12. The chabazite zeolite according to claim 11, wherein the chabazite zeolite contains Cu as an additional element and the additional element is contained in an amount of 2 mass % or more but 10 mass % or less.

13. The chabazite zeolite according to claim 11, wherein the crystallinity is 200% or more but 300% or less.

14. The chabazite zeolite according to claim 13, wherein the chabazite zeolite contains Cu as an additional element and the additional element is contained in an amount of 2 mass % or more but 10 mass % or less.

15. The chabazite zeolite according to claim 13, wherein the lattice constant is 13.50 Å or more but 13.72 Å or less.

16. The chabazite zeolite according to claim 15, wherein the chabazite zeolite contains Cu as an additional element and the additional element is contained in an amount of 2 mass % or more but 10 mass % or less.

17. The chabazite zeolite according to claim 15, wherein the chabazite zeolite has a specific surface area of 350 m$^2$/g or more but 600 m$^2$/g or less.

18. The chabazite zeolite according to claim 17, wherein the chabazite zeolite contains Cu as an additional element and the additional element is contained in an amount of 2 mass % or more but 10 mass % or less.

\* \* \* \* \*